No. 11,909. Reissued May 28, 1901.

O. F. GOOD.

GAS ENGINE.

(Application filed Dec. 29, 1900.)

3 Sheets—Sheet 1.

WITNESSES
Matthew Lubler.
C. M. Theobald.

Oliver F. Good.
INVENTOR
By R. J. McCarty
his ATTORNEY

No. 11,909. Reissued May 28, 1901.

O. F. GOOD.

GAS ENGINE.

(Application filed Dec. 29, 1900.)

3 Sheets—Sheet 2.

WITNESSES

Matthew Sibler.

C. M. Thobald.

Oliver F. Good,

INVENTOR

By R. J. M. Carty his ATTORNEY

No. 11,909. Reissued May 28, 1901.

O. F. GOOD.

GAS ENGINE.

(Application filed Dec. 29, 1900.)

3 Sheets—Sheet 3.

WITNESSES.
Matthew Siebler
C. M. Theobald

INVENTOR
Oliver F. Good.
By R. J. M. Carty
his ATTORNEY

UNITED STATES PATENT OFFICE.

OLIVER F. GOOD, OF DAYTON, OHIO.

GAS-ENGINE.

SPECIFICATION forming part of Reissued Letters Patent No. 11,909, dated May 28, 1901.

Original No. 634,686, dated October 10, 1899. Application for reissue filed December 29, 1900. Serial No. 41,550.

*To all whom it may concern:*

Be it known that I, OLIVER F. GOOD, of Dayton, in the county of Montgomery and State of Ohio, have invented certain new and useful Improvements in Gas-Engines; and I do hereby declare that the following is a full, clear, and exact description of the invention, that will enable others skilled in the art to which it appertains to make and use the same, reference being had to the accompanying drawings, and to the characters of reference marked thereon, which form a part of this specification.

My invention relates to improvements in gas-engines, and has for its object simplicity and cheapness of construction, especially of the valve-box and its accompanying parts; also, to provide a device in which the valve mechanism and governor may be operated by the use of but a single cam and cam-rod; to provide an engine which will run equally as well in either direction, and to provide a valve which shall serve both as an exhaust and inlet valve, whereby the supply of cool air and gas passing over the valve as an inlet-valve will aid in cooling the valve, which usually grows very hot by contact with the escaping burned gases. I attain these objects by means of the devices and arrangements of parts hereinafter described and shown, and illustrated in the accompanying drawings, made part hereof, in which—

Figure 1:
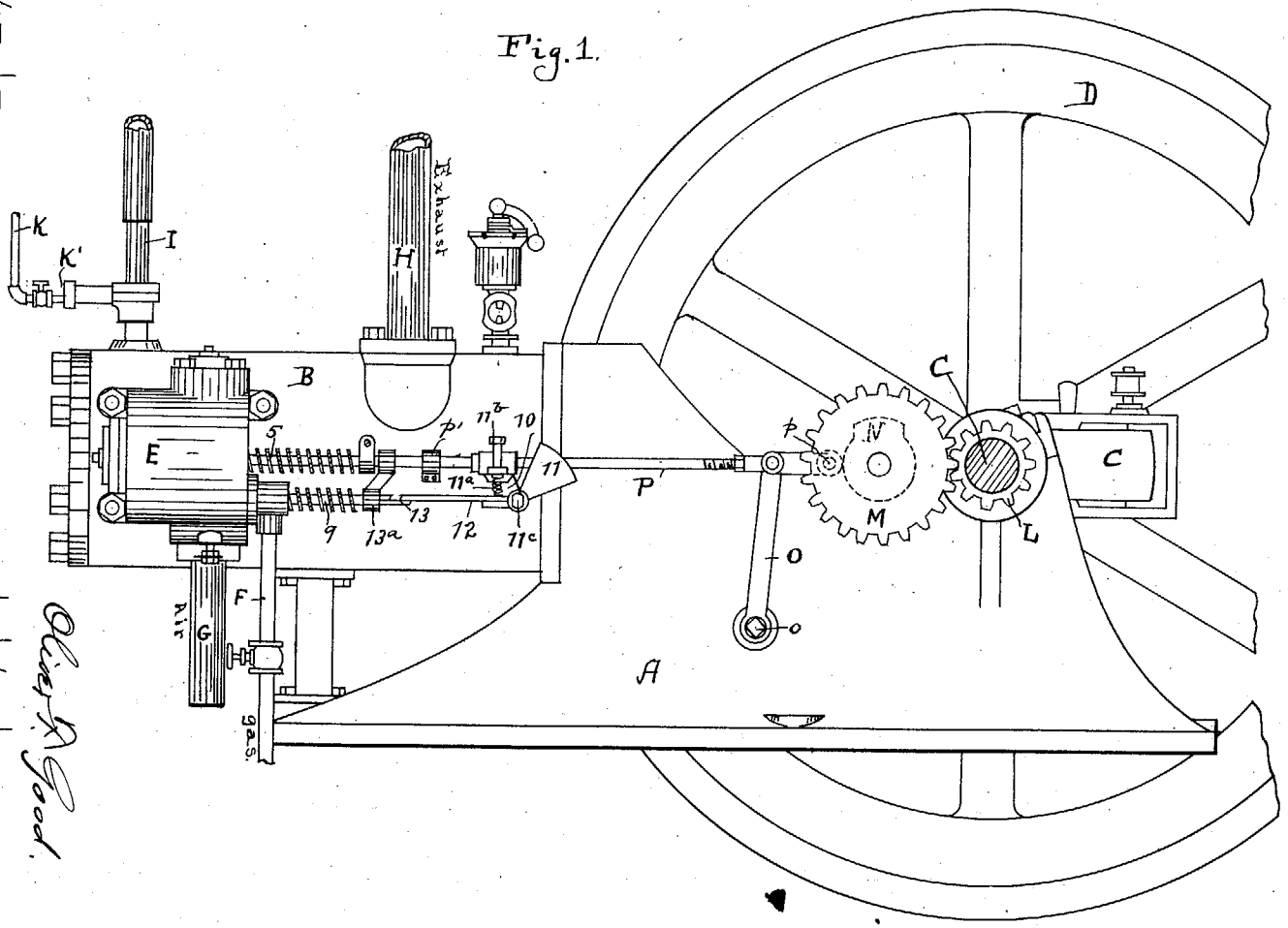
Figure 2:
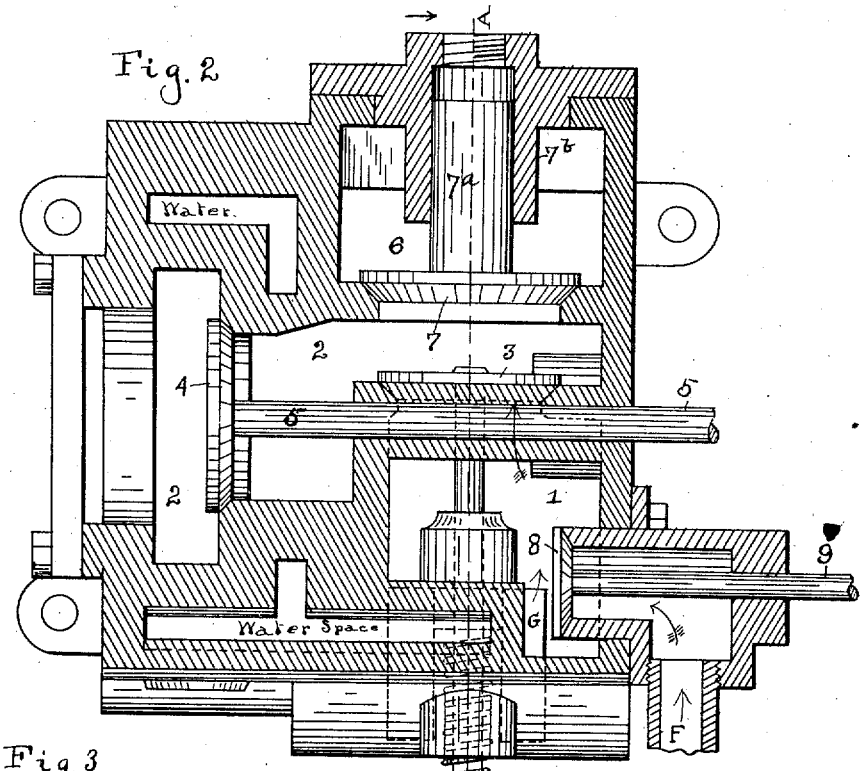
Figure 3:
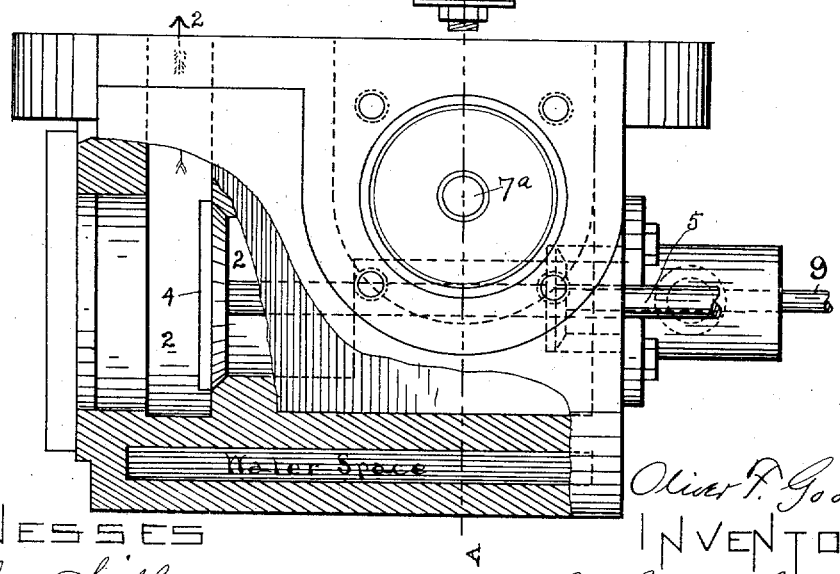
Figure 4:
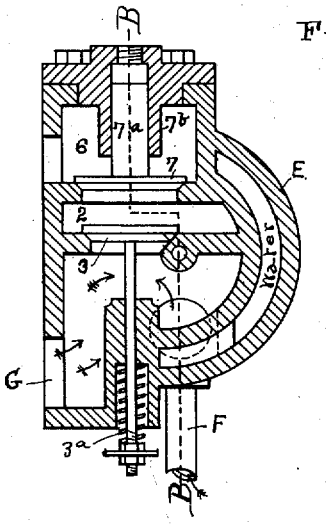
Figure 5:
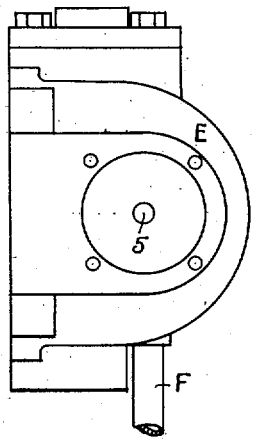
Figure 6:
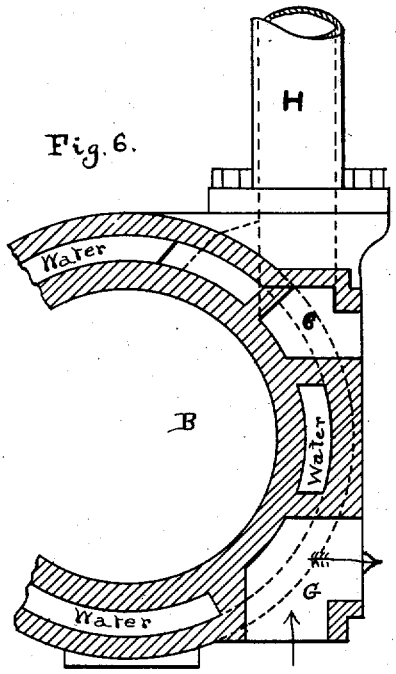
Figure 7:
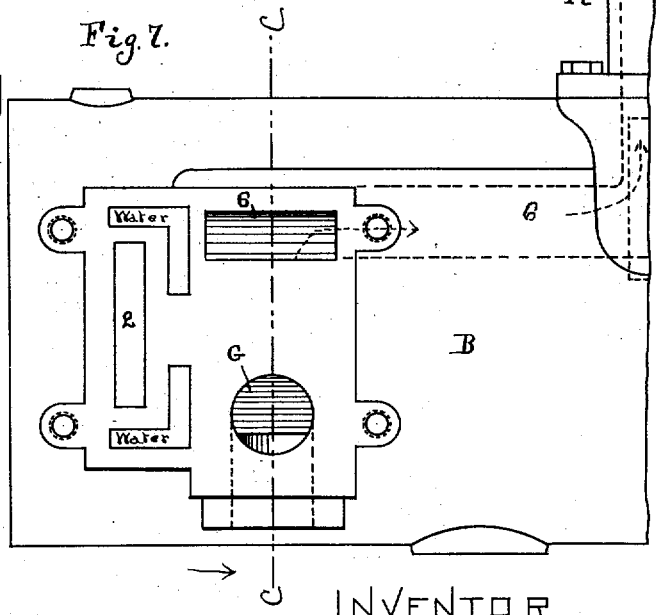

Figure 1 is a side elevation of my engine, showing the parts in place; Fig. 2, a central longitudinal elevation, in vertical section, of the valve-box hereinafter referred to, taken on line B, Fig. 4; Fig. 3, a top plan view of said valve-box with a portion of the cover broken away; Fig. 4, a transverse sectional view of said valve-box, taken on line A, Fig. 3, viewed from the left; Fig. 5, an end elevation of said valve-box viewed from the left in Fig. 1, with cap and main valve removed; Fig. 6, a vertical transverse section of the cylinder on line C, Fig. 7; Fig. 7, a side elevation of the cylinder with the valve-box removed.

Like letters and numerals of reference indicate like parts throughout the drawings.

In the drawings, A is the base of my engine, upon which is secured and supported the cylinder B.

C is the crank-shaft, journaled upon the base, connected by a connecting-rod to the piston (not shown) and carrying in the usual manner the fly-wheel D. The valve-box E is bolted to the side of the cylinder near its outer end—*i. e.*, that end farthest from the crank-shaft—and is provided with a gas-inlet pipe F and an air-inlet pipe G. Leading from near the inner end of the cylinder and connected with its interior as well as the valve-box by a passage or port, hereinafter to be referred to, is the exhaust-pipe H.

I is the ignition-tube and burner.

K is the gas-supply tube, and K′ the air-supply tube for the burner. On the driving-shaft is a pinion L, engaging with and proportioned to make two revolutions to one of a gear-wheel M, journaled upon the base. Upon the hub of this gear-wheel is a cam or eccentric N, which is symmetric in outline, so that its throw is the same when rotated in either direction. Pivoted upon the base at *o* is a rocker-arm O, which pivotally supports the main valve-rod P. This rod has at one end a cam-roller *p*, which takes the cam N and slides in a bracket *p′*, secured to the cylinder.

In the valve-box is a chamber 1, into which lead gas-pipe F and air-pipe G and in which the gas and air are mixed. Leading from the chamber 1 is a port 2, leading to the explosion-chamber of the cylinder, which port, as hereinafter described, becomes alternately an admission and an exhaust port. Between the chamber 1 and the port 2 is seated a valve 3, which is held on its seat by its gravity and by coiled spring $3^a$, surrounding the stem of the valve. This spring is interposed between a nut on the end of the stem and the bottom of a socket in the wall of the valve-box, as appears in Figs. 2 and 4. In port 2 is a valve 4, controlled by valve-stem 5, having spring $5^a$, (see Fig. 1,) which holds the valve 4 normally closed. Leading from chamber or port 2 is an exhaust-port 6, which extends through an opening in the cylinder, as shown by dotted lines in Fig. 7, to the exhaust-pipe H. Between the port or chamber 2 and the exhaust-passage 6 is a valve 7, seated from above and held normally closed by the gravity. The valve-stem $7^a$ reciprocates in a socket in a removable cap $7^b$ upon the valve-box, as shown in Figs. 2 and 4. It will be seen that the two valves 3 and 7 have the same axis and that the device is compact.

In the gas-inlet F is a valve 8, having horizontal stem 9, provided with a spring $9^a$, (see Fig. 1,) which holds the valve 8 normally closed.

Secured to the main valve-rod P is a bracket or hanger 10, upon which is pivotally mounted the governor. This governor is of the gravity or inertia type and has projecting forward from its pivoted weight 11 a finger 12, adapted when in horizontal position, or nearly so, to engage the notched extremity 13 of the valve-stem 9, which controls the valve 8 in the gas-inlet F. Depending from the valve-stem 5 and rigidly secured thereto is an arm $13^a$, which forms a support and guide for the valve-stem 9, which slides in an opening in the lower end of said arm.

The operation of my engine is as follows: Assuming that the parts are assembled as above described, that the ignition-tube I is heated to a proper degree, and that the mixed gas and air are compressed within the explosion-chamber and within the ignition-tube I, the explosion now takes place and the piston is driven forward, communicating motion through the connecting-rod and crank-shaft to the fly-wheel in the usual manner. At this point all the working valves are closed and exhaust takes place through the open exhaust-port into the pipe H. (See Fig. 7.) The cam or eccentric through gears L and M now moves the valve-rod P outwardly and through valve-stem 5 opens the valve 4, permitting the escape of the remaining burned gases as they are expelled by the return of the piston to its starting-point. The gases thus expelled pass out through port 2, lift the valve 7, and through passage 6 escape through exhaust-pipe H. The cam N now holds the valve 4 open, while the piston again moves forward, which movement permits the valve 7 to close by its own weight, and the valve 3 is caused to open by the vacuum formed by the movement of the piston, which permits air to enter behind the advancing piston. The air thus taken is expelled by the alternate backward stroke of the piston over the valves 4 and 7. At each alternate forward stroke air is in this manner drawn in and by the alternate backward stroke expelled until the next explosion takes place, (which is determined by the speed of the engine through the governor,) thereby cooling the exhaust-valves and to a great extent overcoming the difficulty arising from the undue heat of the exhaust-valves and their adjacent parts. The governor-weight 11, pivoted, as at $11^c$, upon the bracket 10, which moves with the rod P at each backward stroke, tilts slightly, lifting its finger 12. If the momentum and speed be sufficient, the weight will tilt sufficiently to throw its arm upwardly and out of line with the valve-stem 9. Otherwise the arm will come in contact with the notched extremity 13 of the valve-stem 9, thus pushing open the valve 8 and admitting gas to the explosion-chamber. The governor-weight 11 is regulated by means of a compression-spring $11^a$ upon the bracket 10, the tension of the spring being controlled by a set-screw $11^b$. Thus by means of the tension-spring, which rests upon the arm 12, the explosion-point in the speed of the engine is established and the valve 8 may be compelled to operate at each alternate stroke of the engine. The speed may be diminished by lessening the tension on said spring. It will be seen that this arrangement of the governor and the valves provides for their proper working and the regulation of the speed of the engine with the use of but a single cam or eccentric and rod, thus dispensing with the multiplicity of parts usually encountered in connecting the fly-wheel and its shaft with the governor and with the valve mechanism of the engine.

Having described my invention, what I claim, and desire to secure by Letters Patent, is—

1. In an explosive-engine, the combination with a cylinder, of a valve-box having a gas and air induction port therein, a vertically-operating valve in said port, an eduction-port in said valve-box, a valve in said eduction-port, a port connecting the induction and eduction ports with the cylinder, and a positively-operated valve in said port, substantially as specified.

2. In an explosive-engine, the combination with a cylinder, of a valve-box, a gas and air induction port therein, a vertically-operating valve in said port, an eduction-port, a vertically-operating automatic valve in the latter port, said valves having the same vertical axis, a positively-operated valve intermediate the two valves and the cylinder, and a chamber common to said valves, substantially as set forth.

3. In an explosive-engine, a cylinder, a valve-box, a gas and air induction port therein, a vertically-operating automatic spring-actuated valve in said port, an eduction-port, and a vertically-operating valve in the latter port, combined with a positively-operated valve 8 which is held normally closed by a spring, and a positively-operating valve intermediate the two valves and cylinder, and a chamber common to said valves, the two automatically-operating valves having the same vertical axis, substantially as set forth.

4. In an explosive-engine, the port 2, the spring-actuated valve 3, the gravity-valve 7 placed in the same axial line with the valve 3 and moving in the same direction, a valve 4 placed upon the valve-rod 5, and the spring 5ᵃ for holding it normally closed, combined with the chamber 1, the gas-inlet F leading into said chamber 1, the gas-inlet valve 8 controlling the admission of gas into the chamber 1, the valve-rod 9, and the spring 9ᵃ placed thereon; the parts being combined and arranged to operate substantially as shown.

In testimony whereof I affix my signature in presence of two witnesses.

OLIVER F. GOOD.

Witnesses:

R. N. BRUMBAUGH,

R. J. MCCARTY.